United States Patent [19]
Bates

[11] 4,077,643
[45] Mar. 7, 1978

[54] DROP FRAME TRAILER

[76] Inventor: Dean E. Bates, 66 Terrace Dr., Binghamton, N.Y. 13905

[21] Appl. No.: 704,123

[22] Filed: Jul. 12, 1976

[51] Int. Cl.$^2$ ............................................. B62D 21/18
[52] U.S. Cl. ................................ 280/43.18; 214/505; 280/43.19; 280/414 R
[58] Field of Search ............... 280/43.17, 43.18, 43.19, 280/43.24, 414 R; 214/505

[56] References Cited

U.S. PATENT DOCUMENTS

| | | | |
|---|---|---|---|
| 2,478,795 | 8/1949 | Whaten | 280/43.18 |
| 2,536,563 | 1/1951 | Montgomery | 280/43.18 |
| 3,018,906 | 1/1962 | Franklin | 280/43.19 |
| 3,384,384 | 5/1968 | Diehl | 280/43.18 |
| 3,701,445 | 10/1972 | Haslem | 280/43.18 |
| 3,811,697 | 5/1974 | Armstrong | 280/43.18 |

Primary Examiner—Robert R. Song
Attorney, Agent, or Firm—George E. Clark

[57] ABSTRACT

A utility trailer has a frame which may be lowered to ground level at both the front and rear portions of the trailer to permit easy access and to facilitate loading and unloading of heavy vehicles or other items. The trailer frame is attached to a U-shaped axle which in turn is connected to a wheel suspension support. The wheel suspension may be raised or lowered by rotation of the wheel suspension about the axle allowing the rear of the trailer frame to be raised or lowered. The front of the trailer frame is connected to a cable controlled by a winch which will permit the lowering or raising of the front part of the trailer frame. Locking pins are employed to lock the suspension and the front portion of the trailer frame in place during travel.

3 Claims, 4 Drawing Figures

DROP FRAME TRAILER

BACKGROUND OF THE INVENTION

The present invention relates to utility trailers and more particularly to utility trailers having a frame capable of being lowered to ground level.

In the prior art, there are several devices used for the lowering or raising of a trailer frame.

For example, one prior art device combines a double tongue arrangement whereby one of the tongues is pivoted in relation to the other by use of a winch and cable. The winch and cable is also used to simultaneously raise and lower the rear part of the frame to provide a substantially parallel relationship with the ground to avoid tilting of a boat or other object being carried by the trailer. The implementation of the rear wheel suspension requires a very complex system of linkages and crank arms at the axle to allow the trailer frame to be raised or lowered. Another prior art device employs independent suspension of each of the rear wheels without having an interconnecting axle. This device is subject to distortion of the frame due to the lack of an axle to keep the wheels in proper alignment. Further the front portion of the trailer is not adapted to be lowered.

In summary, prior art devices for lowering the frame of a trailer to approximately ground level are generally subject to one or more of the following disadvantages:

a. Complex crank and arm mechanism attached to wheel suspension;

b. Lowering only the rear of the trailer, thus resulting an incline of the trailer;

c. Complex cam arrangement for raising or lowering the trailer frame;

d. Independent wheel suspension which reduces the rigidity of the trailer and created alignment difficulties.

SUMMARY OF THE INVENTION

Accordingly, it is an object of the present invention to raise or lower the frame of a utility trailer employing means connected to the trailer frame and to the wheel suspension for lowering the rear of the trailer frame in conjunction with means connected to the forward portion of the trailer frame for lowering the forward portion of the trailer frame to permit the trailer frame to be lowered to ground level.

It is another object of the present invention to raise or lower the frame of a trailer including a leaf spring attachment to a U shaped axle, one end of the leaf spring attached to a frame member of said trailer frame and the other end being attached to a cable to permit the leaf spring to be rotated around the center of the wheel to allow the rear of the trailer to be lowered and wherein the forward portion of the trailer is attached to a cable controlled by a winch which permits raising or lowering of the forward portion of the trailer to ground level.

It is yet another object of the present invention to raise or lower the frame of a utility trailer comprising a trailer frame having a frame member attached to a suspension means, the frame member being hinged so that it may be raised or lowered, thus permitting the suspension means to rotate about the axle of the supporting wheels, a cable attached to the free end of said frame member and to a winch for controlling the raising and lowering the rear portion of the trailer frame; and a cable attached to the forward portion of the trailer frame and to a second winch for raising or lowering the forward portion of the trailer.

It is yet another object of the present invention to raise and lower a trailer frame for a utility trailer by apparatus described above which further includes means for locking the hingeable frame members and the forward portion of the trailer frame in position when the trailer is to be used for transporting an object.

Accordingly, a utility trailer includes a trailer frame, a tongue attached to a hitching means, said tongue being pivotally attached to the trailer frame, a pair of wheels being connected together by a U-shaped axle, said wheels being connected to a suspension support apparatus for supporting the trailer frame, the suspension support apparatus including springs or similar devices having a connection to said axle and having a connection to a frame member, the frame member being hinged at one end and having the other end connected by a cable or similar device to a winch for raising or lowering the rear portion of the trailer frame; the forward portion of the trailer frame being connected to a winch by a cable for raising or lowering the forward portion of the trailer frame independent of the rear portion of the trailer frame. The trailer also includes lock means for securing both forward and rear portions of the trailer frame in the raised position for transportation.

It is an advantage of the present invention that the trailer frame may be lowered to ground level by a relatively simple mechanism which is trouble free and inexpensive.

It is another advantage of the present invention that a drop frame trailer may be implemented using readily available wheel suspension components.

These and other objects, features and advantages of the present invention together with the operation of the invention will be understood by reference to the following detailed description taken together with the drawing.

DETAILED DESCRIPTION OF THE INVENTION

Figure 1:
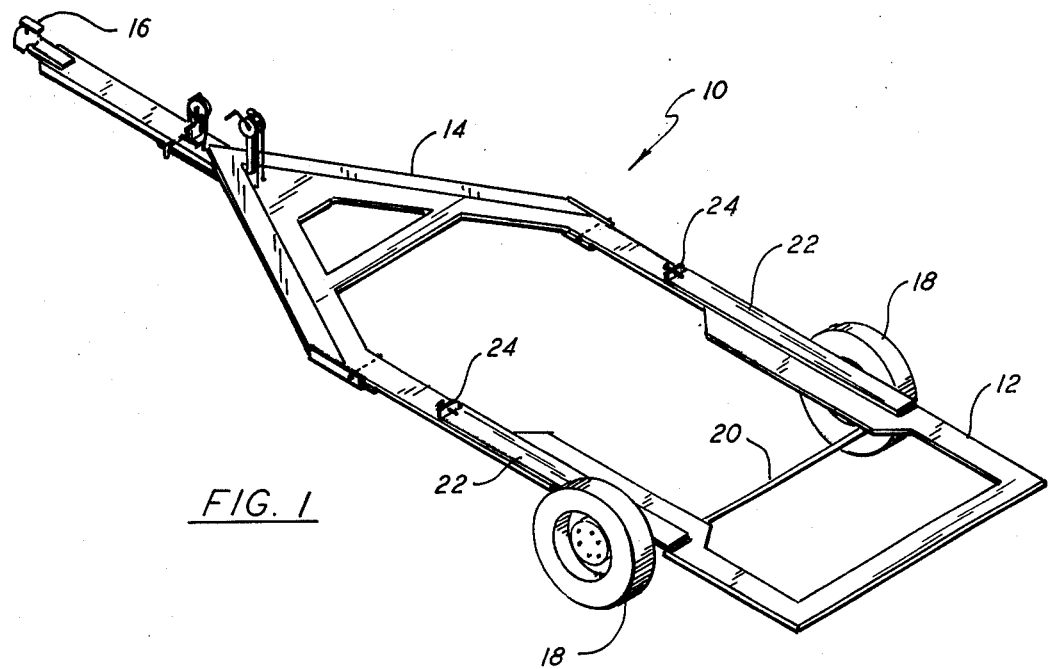
FIG. 1 is an isometric view of a trailer according to the present invention shown in the raised position for transportation.
Figure 2:
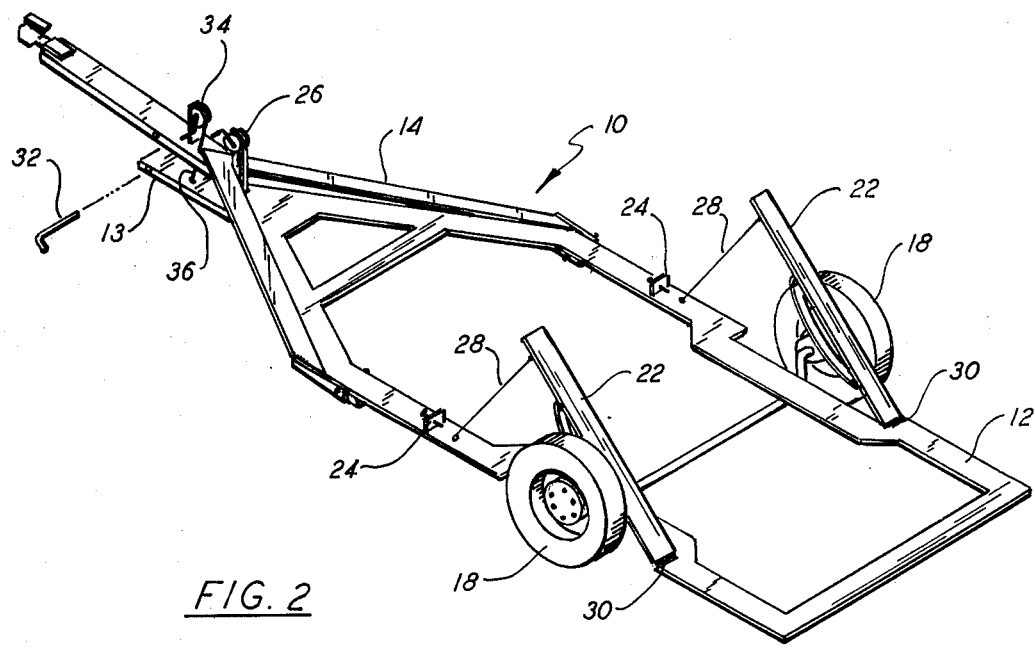
FIG. 2 is an isometric view of the trailer according to the present invention with the trailer frame shown in the lowered position.

Referring now to FIGS. 1 and 2, the utility trailer embodying the present invention will be described.

Utility trailer 10 has a frame 12 which is attached to a Y shaped tongue 14. A hitching mechanism 16 is affixed to the forward portion of tongue 14. The hitching mechanism 16 is used to connect the utility trailer 10 to a towing vehicle (not shown).

Wheel assemblies 18 are connected together by U shaped axle 20. In the raised position as shown in FIG. 1, a suspension support arm 22 on each side of the trailer frame 12 is locked in place by locking pin 24.

Referring now to FIG. 2, the trailer is shown in the lower position. Winch 26 controls the tension in cables 28 which in turn permits suspension support arm 22 to rotate about wheel assembly 18. Wheel suspension support arm 22 is attached to trailer bed 12 by hinge means 30 at the rear portion of suspension support arm 22.

As winch 26 relieves tension on cables 28, suspension support arm 22 is tilted upward at the front portion and the rear portion of trailer frame 12 lowers toward ground level. Similarly, the forward portion of trailer frame 12 may be lowered by first removing locking pin 32 and then rotating winch 34 to relieve the tension on cable 36 thus separating the forward portion 13 of frame 12 from the tongue 14 of the trailer 10.

Figure 3:
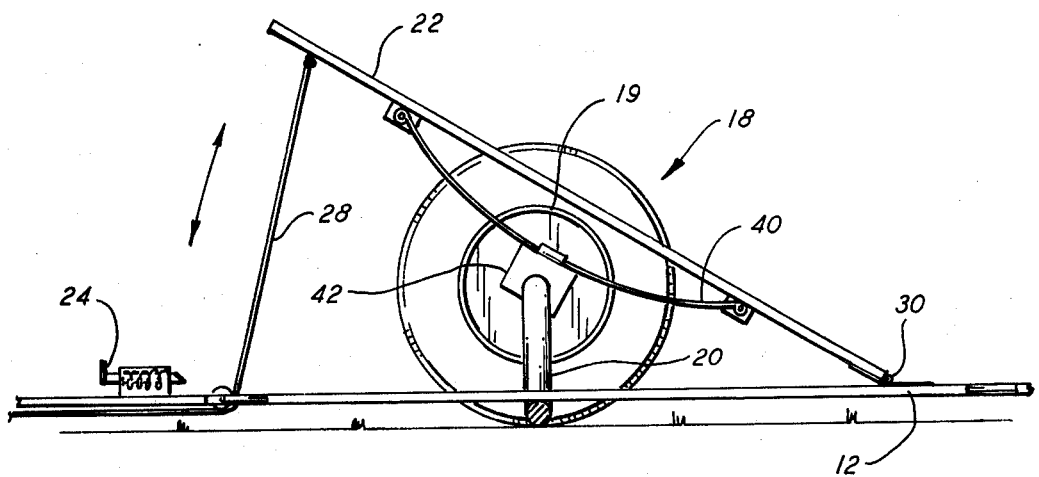
FIG. 3 is a section view of the rear suspension of a trailer according to the present invention together with the apparatus for raising and lowering the trailer frame.

Referring now to FIG. 3, the rear suspension will be described in greater detail. Wheel 19 is connected to U-shaped axle 20. Suspension support arm 22 is mounted on a leaf spring device 40 which is connected to bearing 42 which bears on U-shaped axle 20.

From this figure, it can be seen that as the tension is reduced in cable 28, support arm 22 will rotate about wheel assembly 18 and U shaped axle 20 will move to approximately ground level causing trailer frame 12 to be dropped to ground level.

Lock pin 24 is used to hold suspension support arm 22 in alignment with trailer frame 12 when the trailer bed 12 is in the raised position for transportation.

Figure 4:
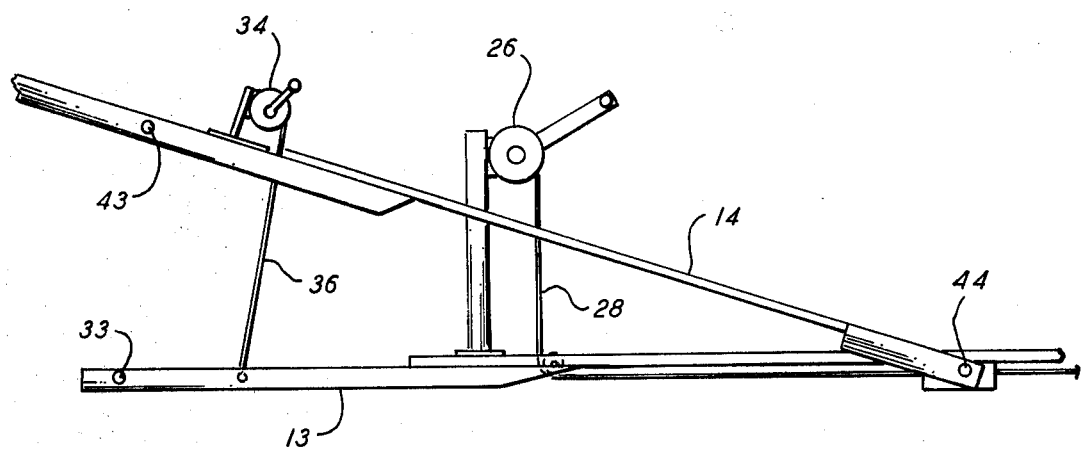
FIG. 4 is a side view of the forward portion of a trailer according to the present invention showing the means for controlling raising and lowering of the forward and rear portions of the trailer frame.

Referring now to FIG. 4, the mechanism for raising and lowering the forward portion 13 of the trailer 10 will be described in greater detail.

Forward portion 13 of trailer frame 12 is connected to the Y-shaped tongue 14 by hinge pins 44.

Winch assembly 34 which controls cable 36 raises and lowers the forward portion 13 of trailer frame 12. Holes 33 and 43 in forward portion 13 and tongue 14 respectively accept lock pin 32 shown in FIG. 2 for locking the trailer in the raised position for transportation.

Winch assembly 26 controls cable 28 which in turn controls the position of suspension support arm 22 at the rear portion of trailer.

Although the invention has been described with respect to specific suspension means and manually operated winches controlling cables to raise and lower the trailer frame, there are many alternatives which could be used for these functions.

While invention has been described with reference to a preferred embodiment, thereof, it is understood by those skilled in the art that various changes in form and material may be made without departing from the spirit or scope of the invention.

What is claim is:

1. A utility trailer, comprising;
a frame for holding an item to be transported;
means for suspending said frame from two or more wheels said suspension means comprising lever means pivotally connected at one end thereof to said frame and having a spring means connecting said lever means to an axle, which axle connects said wheels together for raising or lowering a rear portion of said frame in response to a force applied at a free end of said lever means;
a yoke having a hitch connected to a first end thereof and having second and third ends thereof pivotally connected to points on said frame between a point of attachment of said suspension means and a forward point on said frame, said yoke allowing a forward portion of said frame to be raised and lowered independent of said rear portion of said frame said yoke device being of sufficient length to allow said forward portion of said frame to be lowered to ground level with minimum depression from the horizontal of said yoke device at said hitch connected to a towing vehicle;
a first winch mounted on a forward portion of said frame for controlling a first tension cable said first tension cable connected to said free-end of said lever means for raising or lowering a rear portion of said frame as said winch is operated;
a second winch mounted on a forward portion of said yoke having a second tension cable wound thereon, an end of said second tension cable attached to a point on said forward portion of said frame for controlling the raising and lowering of said forward portion of said frame independently from the raising and lowering of said rear portion of said frame.

2. Apparatus according to claim 1, further comprising means for connecting said utility trailer to towing vehicle.

3. A utility trailer according to claim 1, further comprising means for locking said frame in a raised position for transportation.

* * * * *